US010609896B2

(12) United States Patent
Kraaij et al.

(10) Patent No.: US 10,609,896 B2
(45) Date of Patent: Apr. 7, 2020

(54) MILKING ROBOT

(71) Applicant: Lely Patent N.V., PB Maassluis (NL)

(72) Inventors: Dirk Kraaij, Delft (NL); Michiel Brevet, Schiedam (NL)

(73) Assignee: Lely Patent N.V., Maassluis (NL)

( * ) Notice: Subject to any disclaimer, the term of this patent is extended or adjusted under 35 U.S.C. 154(b) by 288 days.

(21) Appl. No.: 15/797,530

(22) Filed: Oct. 30, 2017

(65) Prior Publication Data

US 2018/0116172 A1 May 3, 2018

(30) Foreign Application Priority Data

Oct. 28, 2016 (NL) .................................... 2017686

(51) Int. Cl.
*A01K 1/00* (2006.01)
*A01K 1/12* (2006.01)
(Continued)

(52) U.S. Cl.
CPC ................ *A01K 1/12* (2013.01); *A01J 5/003* (2013.01); *A01J 5/017* (2013.01); *B25J 9/046* (2013.01);
(Continued)

(58) Field of Classification Search
None
See application file for complete search history.

(56) References Cited

U.S. PATENT DOCUMENTS 3,709,196 A * 1/1973 Hicks ........................ A01J 5/04
119/14.04
3,759,225 A * 9/1973 Galbraith ............... A01K 1/126
119/14.04
(Continued)

*Primary Examiner* — Yvonne R Abbott-Lewis
(74) *Attorney, Agent, or Firm* — Oblon, McClelland, Maier & Neustadt, L.L.P.

(57) ABSTRACT

Milking robot device for automatically milking a dairy animal, comprising a milking box having milking cups and a robot arm having an end effector for applying the milking cups to the teats of the dairy animal, on which milking box the robot arm is suspended above the dairy animal to be milked. The robot arm comprises a first arm part connected to the milking box by a first joint, and a second arm part connected to the first arm part by a second joint and provided with an end effector. The first and second arm part, respectively, is pivotable in a vertical plane with respect to the milking box and the first arm part, respectively, by a first and second actuator, respectively. The end effector is movable within an operating range by the robot arm. The milking robot comprises a weight compensation device having a spring device between the milking box and the robot arm. This is configured to exert a first torque about the first joint and a second torque about the second joint, in such a way that, viewed over the operating range, the first torque compensates for the torque exerted by gravity on the arm about the first joint by at least half, in particular by at least 90%, and the second torque compensates for the torque exerted by gravity on the arm about the second joint by at least half, in particular by at least 90%. Consequently, a compact robot arm is provided, the joints which are suspended relatively high up can be protected from dirt in an efficient manner, and they can be operated using much lighter actuators, so that a great deal of energy can also be saved.

10 Claims, 4 Drawing Sheets

Figure 1:
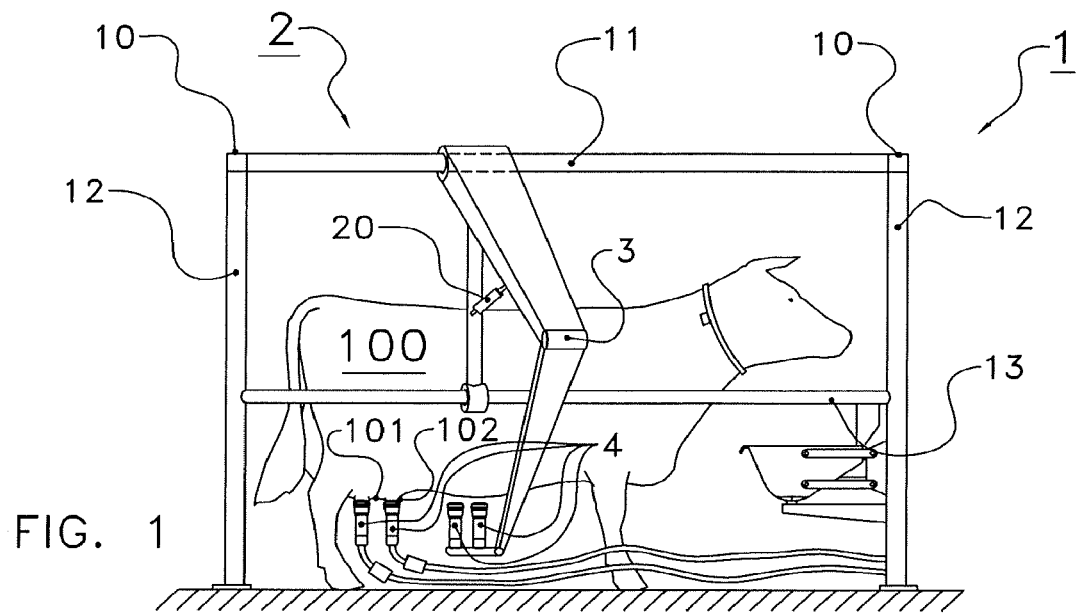

(51) Int. Cl.
*A01J 5/017* (2006.01)
*B25J 9/14* (2006.01)
*B25J 9/12* (2006.01)
*B25J 9/04* (2006.01)
*B25J 19/00* (2006.01)
*A01J 5/003* (2006.01)
*B25J 9/16* (2006.01)

(52) U.S. Cl.
CPC ............... *B25J 9/123* (2013.01); *B25J 9/144* (2013.01); *B25J 9/1633* (2013.01); *B25J 19/0012* (2013.01); *B25J 19/0016* (2013.01); *G05B 2219/45113* (2013.01); *Y10S 901/02* (2013.01)

(56) References Cited

U.S. PATENT DOCUMENTS

| | | | | |
|---|---|---|---|---|
| 3,762,370 A * | 10/1973 | Gulleson | A01K 1/126 | 119/14.03 |
| 3,765,373 A * | 10/1973 | Phillips | A01K 1/126 | 119/14.04 |
| 3,810,442 A * | 5/1974 | Jacobs | A01K 1/12 | 119/14.03 |
| 3,877,419 A * | 4/1975 | Rodger | A01K 1/123 | 119/14.03 |
| 4,006,712 A * | 2/1977 | Peel | A01K 1/12 | 119/14.03 |
| 4,194,467 A * | 3/1980 | Nielsen | A01K 1/0606 | 119/14.03 |
| 4,261,292 A * | 4/1981 | Le Du | A01K 1/12 | 119/14.04 |
| 4,323,033 A * | 4/1982 | Vosyka | A01K 1/0035 | 119/14.04 |
| 5,069,160 A * | 12/1991 | Street | A01J 5/0175 | 119/14.08 |
| 5,361,722 A * | 11/1994 | Tecza | A01J 5/044 | 119/14.03 |
| 5,718,185 A * | 2/1998 | Pichler | A01K 1/126 | 119/14.04 |
| 6,050,219 A * | 4/2000 | van der Lely | A01J 5/0175 | 119/14.04 |
| 7,017,516 B2 * | 3/2006 | Eriksson | A01K 1/126 | 119/14.04 |
| 2018/0235170 A1 * | 8/2018 | Kraaij | A01J 5/0175 | |

* cited by examiner

MILKING ROBOT

The present invention relates to a milking robot device for automatically milking a dairy animal, comprising a milking box having a plurality of milking cups and a robot arm having an end effector for applying the milking cups to the teats of the dairy animal.

Such milking robots are generally known per se. In practice, heavy and diverse demands are placed on such a milking robot system. For instance, the robot arm moves to underneath the dairy animal and may be exposed to kicks from the dairy animal. Most robot arms are therefore configured to be very robust. Conversely, however, the animal safety should be ensured as far as possible during use of the robot arm. Moreover, the dairy animals often differ considerably from one another in dimensions, as a result of which a relatively large operating range is required for the arm. A milking stall environment is also highly polluting, due to aggressive vapours and optionally manure or urine splashing high up. Furthermore, a milking robot is in principle continuously in operation and thus uses a considerably amount of energy.

In practice, it appears that the current milking robot devices do not satisfy said demands or circumstances in an optimum manner. It is therefore an object of the present invention to provide a milking robot device which better satisfies at least some of the above-mentioned demands.

The invention achieves this object by a milking robot device according to claim 1, in particular a milking robot device for automatically milking a dairy animal, comprising a milking box having a plurality of milking cups and a robot arm having an end effector for applying the milking cups to the teats of the dairy animal, on which milking box the robot arm is suspended above the dairy animal to be milked, wherein the robot arm comprises a first arm part connected to the milking box by a first joint, and a second arm part connected to the first arm part by a second joint and provided with an end effector, wherein the first arm part is pivotable in a vertical plane with respect to the milking box by a first actuator, and the second arm part is pivotable in a vertical plane with respect to said first arm part by a second actuator, wherein the end effector is movable within an operating range by the robot arm, wherein the milking robot further comprises a weight compensation device having a spring device, which is connected between the milking box and the robot arm, and which is configured to exert a first torque about the first joint and a second torque about the second joint, in such a way that, viewed over the operating range, the first torque compensates for the torque exerted by gravity on the arm about the first joint by at least half, in particular by at least 90%, and the second torque compensates for the torque exerted by gravity on the arm about the second joint by at least half, in particular by at least 90%.

It should be noted here that the first and second arm part, respectively, is exclusively pivotable in a vertical plane in particular by the first actuator and second actuator, respectively, which may make the construction as a whole, and the joints in particular, more robust. It may be desired in this case for the robot arm construction as a whole to be movable horizontally, for example along a guide rail. However, this makes no difference to the weight compensation and the other aspects of the invention.

With the aid of the two arm parts and the two joints, it is relatively simple both to create a sufficiently large operating range and to keep the joints high above the ground in doing so. In this case, it even appears to be possible to keep the joints higher than the dairy animal to be milked, as will be explained in more detail below.

Furthermore, the first and second "torque of the force of gravity on the robot arm", respectively, in principle refers to the torque exerted by the force of gravity about the first and second joint, respectively, on all robot arm parts which are movable in a vertical plane. According to the invention, this first and second torque, respectively, is counteracted or compensated for with the aid of the spring force exerted on the robot arm by the weight compensation device, with it being necessary to select the (at least one) engagement point, the size and direction(s of the components) of the spring force in accordance with, inter alia, the geometry and mass distribution of the robot arm (parts). This will be explained in more detail below with reference to several examples.

The concept behind the invention is a combination of insights. For instance, the high suspension of the arm, and thus of the joints between the arm parts, ensures that at least the majority of the more vulnerable parts such as joints remain far from direct contamination by manure and urine splashes. The movement of the end effector, for example in the horizontal direction, is achieved in this case by pivoting the arm parts about rotation points which are arranged higher up. The combination of arm parts and joints allows a compact robot arm construction, certainly in comparison with a Cartesian robot arm.

Although the high suspension with pivotability in the vertical plane means that the entire weight of the arm must be moved and borne, this is in turn compensated for according to the invention by the weight compensation device. The latter ensures that the net weight to be moved seems much smaller, by compensating for the moment of force of the gravity. As a result, the torque required from actuators such as electrical actuators is lower, as a result of which actuators can also be smaller, and thus the total construction also lighter and more compact. It also ensures that less force and thus energy is needed to move the arm within the operating range. This in turn entails a greater level of inherent safety for the dairy animals, on the one hand because the forces exerted by the robot arm are slightly less, and on the other hand because the dairy animal, but also for example an operator, can more easily free itself in a perilous situation, or is at least able to push away the robot arm. It is this combination of features and properties which allows the milking robot installation according to the invention to better satisfy the demands mentioned above.

A robot arm with Cartesian drives is known per se from EP0300115, having three mutually perpendicular guide bars. There are thus no weight compensation problems, since the vertical movements can be compensated for by a pulley and counterweight, but the arm is more susceptible to contamination of the milking cups and the entirety is less compact given the same operating range. Furthermore, a robot arm with 3 electrical drives is known from WO02/102142. However, the document does not refer to any other embodiment detail of the robot arm or to why this drive should have any advantage, or any other advantage in relation to the above-mentioned demands on the milking robot device.

Specific embodiments are described in the dependent claims, as well as in the part of the description which now follows.

In embodiments, at least one, and in particular each, of the actuators is or comprises an electrical actuator, such as a spindle. This offers the advantage that the actuator does not fall loosely to the ground in the event of a fault such as failure of the power supply, but in principle will remain in place due to internal friction. As a result, there is less risk of unnecessary contamination of, in particular, the milking cups in the event of a fault. Due to this internal friction, it is also possible on account of the weight compensation to save extra energy in comparison with non-compensated milking robot devices with electrical actuators. After all, the latter must in principle be continuously actuated during operation, even if the robot arm assumes a fixed position, for example under a dairy animal. As a result, there is in principle a higher energy consumption than with other actuators such as pneumatic or hydraulic, which are able to stay in a position without consumption by obstructing the fluid flow by closing a valve. However, in the present invention, the effective or apparent weight for the actuators can be reduced in such a way that the friction is more or less able to assume the function of said valve. Incidentally, the energy consumption is also slightly lower with very low friction, because the continuous torque required in that case can still be reduced by at least half, and advantageously by approximately 90%.

In embodiments, at least one, and in particular each, of the actuators is or comprises a pneumatic actuator. One advantage of the invention in this case is that this may also be configured to be lighter and smaller, which entails that the actuator uses less (purified and tempered) air and energy when moving the robot arm. As this is in principle continuously in operating, there may also be a considerable saving in this case. As already stated above, other actuators are also possible, such as in this case a hydraulic actuator, which can likewise be configured to be lighter.

In embodiments, the spring device is connected at a first end to the milking box, and at a second end to the first arm part via a first bar, and to the second arm part via a second bar. With such a construction, it appears to be readily possible to reduce the apparent weight of the robot arm over the operating range required for a milking robot by more than half, up to around 90%. In this case, the spring device may be a coil spring, gas spring, etc. In this case, a gas spring has the advantage that it can be combined, for example, with an overload protection device.

It should be noted here that the spring device is thus better configured to exert two different moments of force, in such a way that the respective moments of force of the gravity on the first and second joints can largely be compensated for. It should also be noted the centre of gravity and therefore the moments of force of the gravity are reasonably variable due to the change in shape of the arm, through pivoting about the two joints. The length and orientation of the bars can then be adjusted thereto.

In particular, the first bar is connected to the first arm part on a half of the first arm part which faces away from the milking box, and the second bar is connected to the second arm part on a half of the second arm part which faces the first arm part, in particular on a third of the second arm part which is connected to the first arm part. Here, "half" and "third", respectively, are used to refer to a part of the respective robot arm part equivalent to half of the length and a third of the length, respectively, of said arm part. The relevant bars are then connected to the arm part within the relevant part of the arm part. The forces and moments can thus be optimized without overly impairing the compactness and the operating range of the robot arm or the milking system in general.

In a particularly attractive embodiment of the milking device according to the invention, the end effector comprises four cup holders each with a milking cup. In particular, these cup holders are all directly connected to the end effector and thus to the robot arm. This also means that the end effector bears all four of the milking cups on the respective cup holders in a non-operative state, such as between milking operations. Such a robot arm is larger and heavier than a robot arm which grasps and applies the milking cups one by one, and will thus benefit even more from the present invention. An example of a robot arm for use in this embodiment is the Lely Astronaut®, which has an end effector with four milking cups. It should be noted here that the robot arm may comprise yet other parts, such as a teat detection system, a set of brushes or other teat pre-treatment device, etc.

Figure 2:
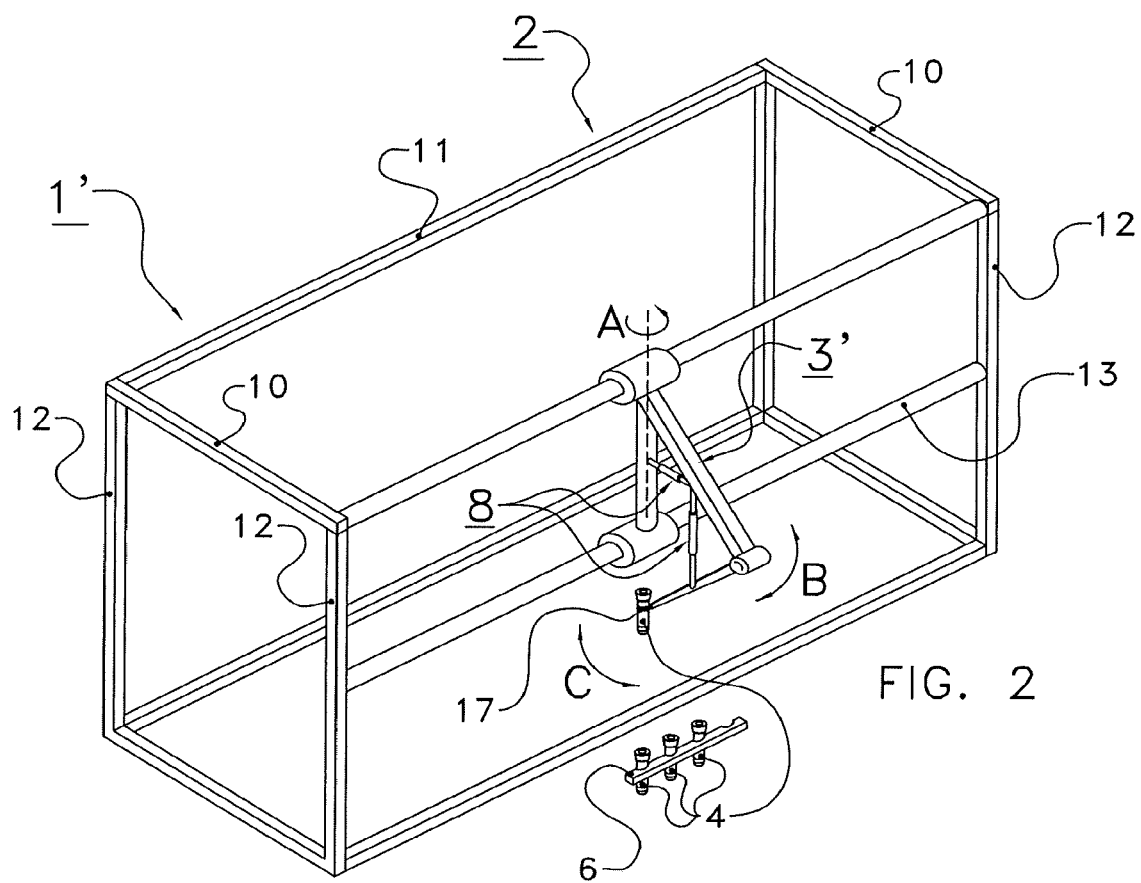
Figure 3:
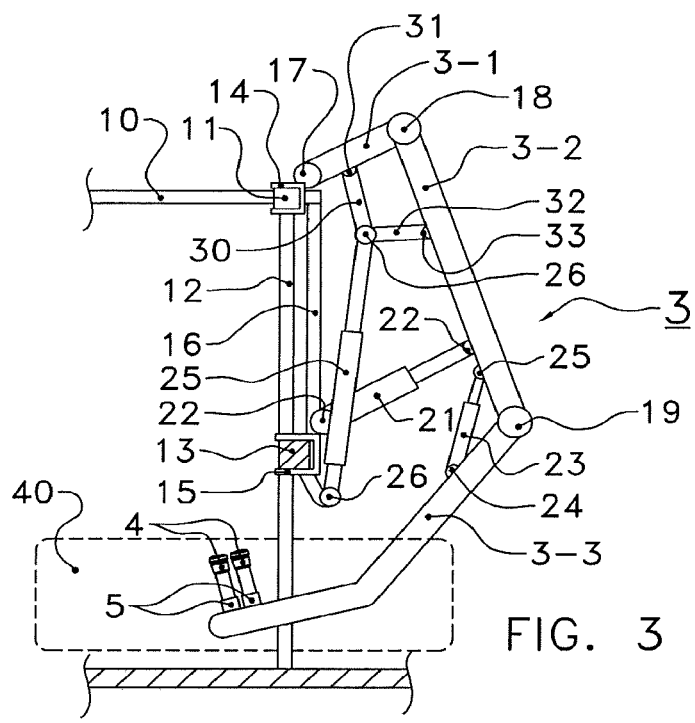
Figure 4:
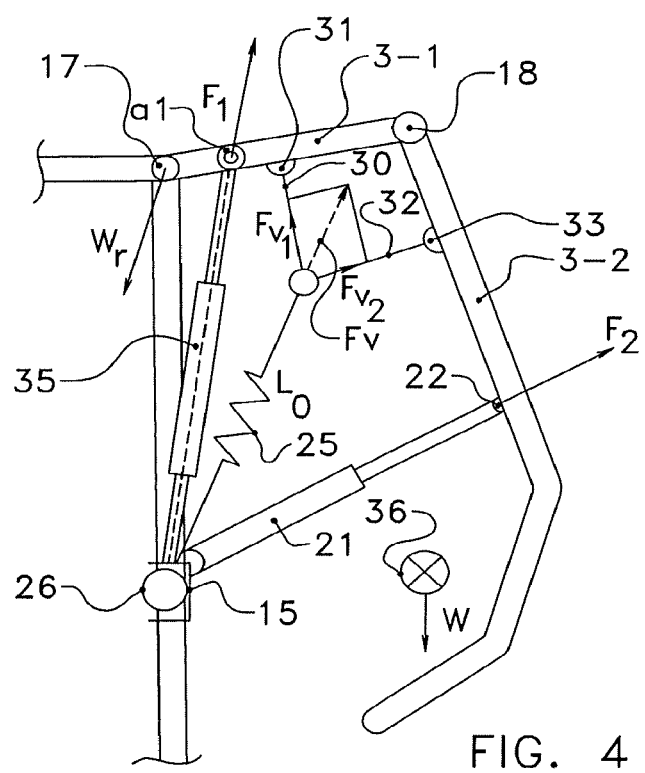
Figure 5:
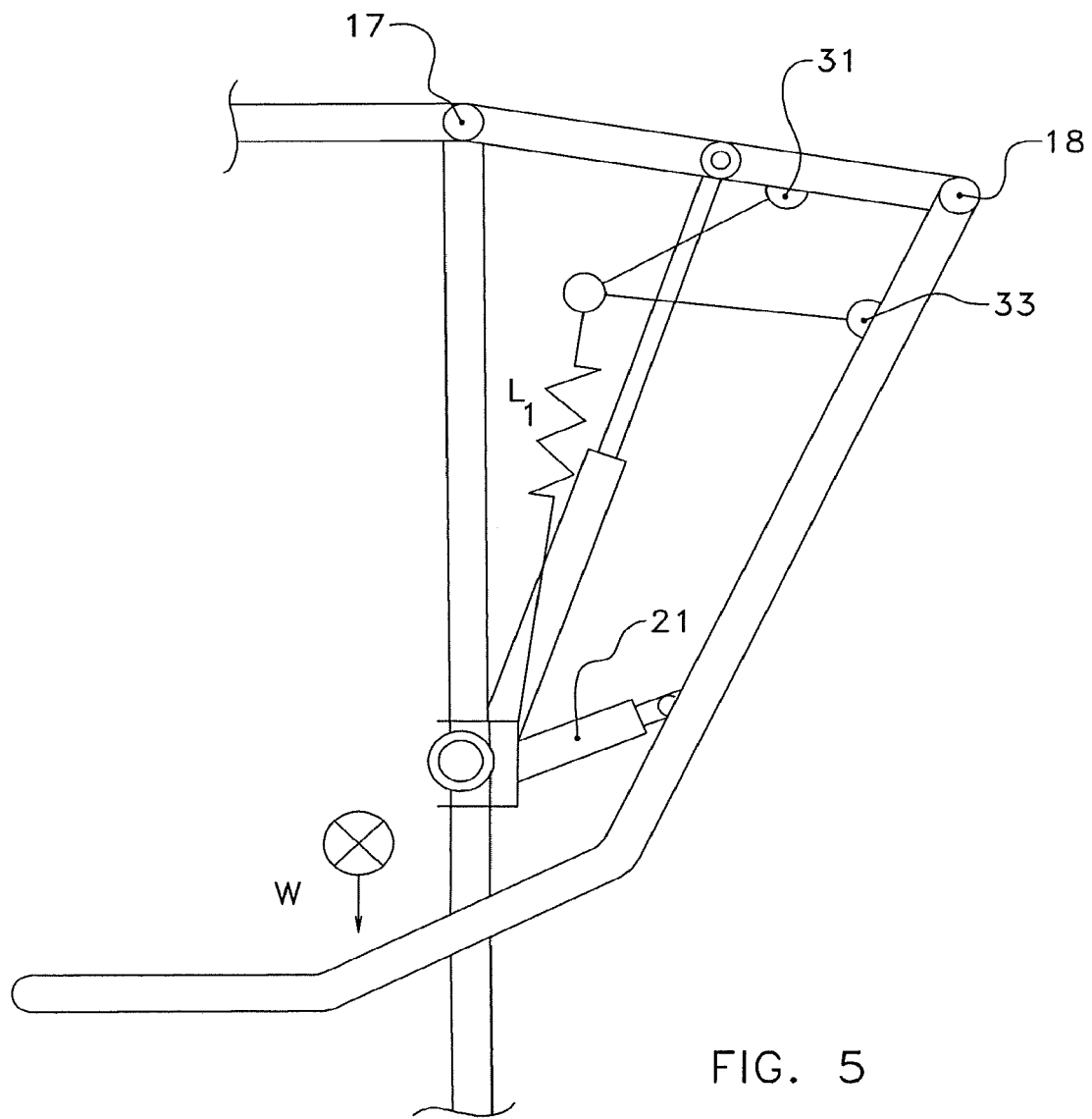
Figure 6:
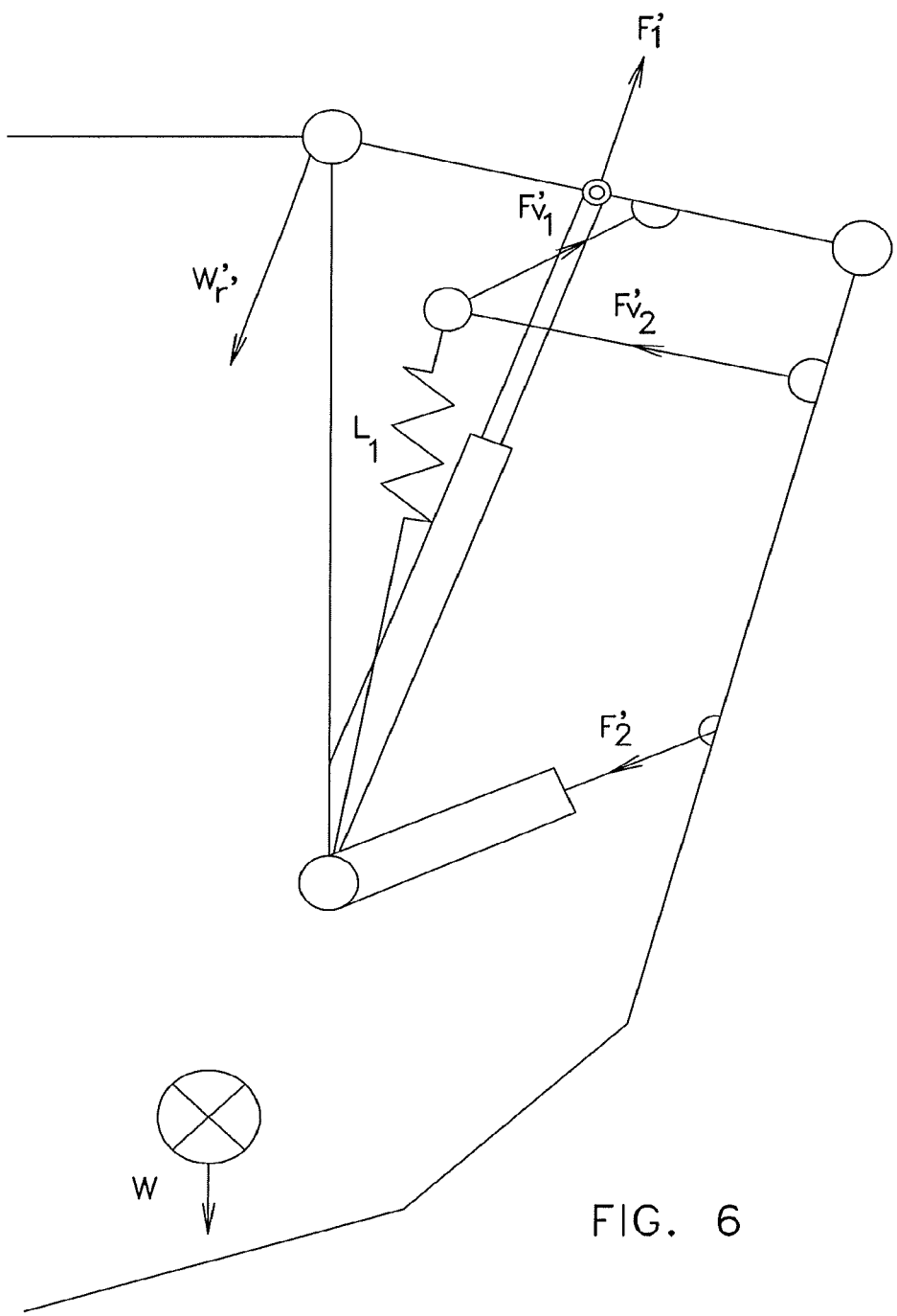

The invention will now be discussed in more detail with reference to the drawing, which shows one or more embodiments of the invention and in which, more particularly:

FIG. 1 shows a highly diagrammatical perspective view of a milking robot device according to the invention, FIG. 2 shows an alternative milking robot device, FIG. 3 shows a diagrammatic cross section of a detail of a milking robot device according to the invention, FIG. 4 diagrammatically shows a force diagram during use of the milking robot device according to the invention, FIG. 5 diagrammatically shows an embodiment with a different position of the robot arm, and FIG. 6 shows a simplified and diagrammatic representation (not to scale) of the forces associated with FIG. 5.

FIG. 1 shows a highly diagrammatical perspective view of a milking robot device 1 according to the invention. The device comprises a milking box, which is denoted overall by reference numeral 2, and a robot arm 3 with milking cups 4. The milking box comprises top transverse beams 10 and top longitudinal beams 11 and also posts 12 and a central longitudinal beam 13. A weight compensation device is denoted highly diagrammatically by 20.

A dairy animal is denoted by reference numeral 100 and has an udder 101 with teats 102.

The illustrated milking robot device 1 is configured to connect the milking cups 4 to the teats 102 of the dairy animal 100. To this end, the device 1 comprises actuators (not shown here) for moving the robot arm 3 and controlling the various parts of the robot arm in order to move the milking cups 4 in the direction of the teats 102. All this will be shown in more detail in FIG. 3. According to the invention, the device 1 comprises a weight compensation device 20, which will also be elaborated on in more detail in FIG. 3.

FIG. 2 shows an alternative milking robot device, with similar parts being denoted by the same reference numerals, optionally provided with a prime. The robot arm 3' in this case comprises a suspension which can rotate about a vertical axis in the direction of the arrow A at the top of the milking box, and a gripper 7 for grasping milking cups from a cup magazine 6, which gripper can be moved in the direction of the arrows B and C by actuators 8 which are shown here.

FIG. 3 shows a diagrammatical cross-sectional side view of a detail of a milking robot device according to the invention. The figure shows a robot arm 3 which is suspended from a top carriage part 14 and a bottom carriage part 15, which are connected to one another by carriage beam 16. The robot arm 3 comprises a first or top robot arm part 3-1, a second or central robot arm part 3-2 and (optionally) a bottom robot arm part or end effector 3-3. The robot arm 3 also comprises a first arm joint 17, a second arm joint 18 and (optionally) a third arm joint 19. Also shown, albeit only high diagrammatically, are a first arm cylinder 21 and an (optional) second arm cylinder 23, which are attached by respective first cylinder joints 22 and second cylinder joints 24 between the carriage beam 16 and the respective robot arm parts.

In addition, a weight compensation device is shown in the form of a gas spring 25 which is attached by a gas spring joint 26 to the bottom carriage part 15 and to a first bar 30 and a second bar 32, which are connected pivotably in gas spring joint 26 and first bar joint 31 and second bar joint 33, respectively, to the first arm part 3-1 and the second arm part 3-2, respectively. It should be noted that, for the sake of clarity, this figure does not show the actuator between the carriage beam 16 and the first arm part 3-1, which without the weight compensation device would have to bear the greatest weight. However, this will be further clarified in FIG. 4.

The illustrated robot arm 3 with the actuators can move the milking cups 4 which are placed on milking cup holders 5 within an operating range 40, the limits of which are indicated by the dashed line. The operating range 40 may be so large, for example running from well outside the milking box to beyond the centre of the milking box, that the net centre of gravity of the whole robot arm 3 may shift over a considerably large distance. In order to in any case achieve a sufficiently effective weight compensation over this considerably large operating range 40, the gas spring 25 must be correctly positioned with respect to the relevant arm parts 3-1 and in this case 3-2 on the basis of calculations (for example using a mathematical model of the kinematics, which allows the net reduction in gravity to be calculated as a function of the design parameters and the operating range of the arm, and a method of least squares, which allows optimum combinations of design parameters of the model to be calculated, once more given the desired operating range and the centre of gravity of the arm) or trial-and-error. To this end, the gas spring 25 is not connected to one robot arm part using solely a single bar, but is connected to two robot arm parts by means of a first bar 30 and a second bar 32. In the event of a change in shape of the robot arm, and therefore a (relatively strong) displacement of the centre of gravity, the direction and the engagement point of the spring force of the gas spring 25 and of the components thereof which act via the bars 30 and 32 will thus also move in an efficient manner.

It should be noted here that the division of the robot arm into a first, second and third robot arm part is optional. It is sufficient if only a first arm part and a second arm part with end effector are provided. This has the advantage that the joints 17 and 18 can be both arranged high up, far from urine or manure splashes. This may be achieved, for example, by configuring joint 19 to be rigid, for instance as a weld, with arm parts 3-2 and 3-3 thus essentially being rigidly connected to one single arm part. However, in some cases a joint 19 with a cylinder 23 may be advantageous, for example as an overload protection device in the event of a kick from a cow. The cylinder then serves as a gas spring which expands only in the event of an excessive load (kick from a cow or the like) and allows arm part 3-3 to rotate about joint 19. This embodiment is able to respond faster than one in which the entire arm would have to rotate with arm part 3-2 and 3-3.

It is advantageous if the first engagement point of the first bar 30, in other words the first bar joint 31, is connected to the first arm part 3-1 and is either in the centre of the arm part 3-1 or between that centre and the first arm joint 17. It is likewise advantageous if the engagement point of the second bar 32, in other words second bar joint 33, is situated no further than the centre of the second arm part 3-2, and advantageously between the second arm joint 18 and a point at one-third of the length of the second arm part. Thus connected to the gas spring 25, the latter will be able to largely cancel out the moment of force of the gravity on the robot arm 3 over the operating range 40 in a suitable manner, both a first moment of force around joint 17 and a second moment of force around joint 18. Consequently, the moments of force by in particular the first arm cylinder 21 and the arm actuator (not illustrated here) which moves the first arm part 3-1 with respect to the top carriage part 14 will be much smaller than without the weight compensation.

The robot arm shown in this example comprises four milking cups 4 on four cup holders 5. The robot arm 3 as a whole will thus be heavier than, for example, the embodiment of the robot arm in FIG. 2, which only has to carry one milking cup 4, without any cup holder. The robot arm 3 of FIG. 3, or at least the end effector, also needs to be larger and wider in order to be able to carry all four of the milking cups. Moreover, since in both cases the robot arm 3 and 3', respectively, needs to be configured to be sufficiently robust in order to be able to resist, for example, kicks from dairy animals, the total weight of such a robot arm 3 is often fairly high. In a practical example, a robot arm 3 has a mass of approximately 100 kg. As a result of the weight compensation, this mass, in terms of the forces to be exerted, appears to have been reduced to a maximum of approximately 10 kg, and even of less than 5 kg in a large part of the operating range 40. The means that the required moments of force which need to be exerted on the robot arm parts by the actuators can likewise be reduced by approximately a factor of ten to twenty. The actuators required for this purpose are dimensioned on the basis of the (maximum) torque that they generate. As the maximum torque now required is much less than without the weight compensation device, the actuators can be much smaller. Incidentally, it should be noted here that, in this and other embodiments, it has been assumed for the sake of convenience that the actuators are cylinders. However, in this and all other embodiments, there may alternatively or additionally also be electrical actuators such as spindles, etc. Furthermore, these may also be incorporated into the joints, and for example be provided with a planetary transmission. However, the choice of the actuator is of minor importance for the present invention.

FIG. 4 diagrammatically shows a force diagram of the most relevant forces which occur in the device according to FIG. 3. This shows the actuator 35, which is connected amid the bottom carriage part 15 with a hinge joint (not illustrated) as well as to the first arm part 3-1 with a joint which is indicated by $a_1$. The force exerted by the actuator 35 is illustrated diagrammatically here by the vector $F_1$. Likewise, the force exerted by actuator 21 on the arm part 3-2 is denoted by $F_2$.

The weight compensation gas spring 25, which may also be a different type of spring and in this case is only illustrated symbolically between the joints 26, 31 and 33, has a basic length L0 and, via the bars 30 and 32, the respective spring force component $F_{v1}$ is exerted on the first arm part 3-1, at the first bar joint 31, and a second spring force component $F_{v2}$ is exerted on the second arm part 3-2 at the second bar joint 33.

Also shown is the position of the centre of gravity 36 in this situation, where the force of gravity W is exerted. Finally, a reaction force $W_r$ is shown, which is exerted on the top carriage part 14 at the first arm joint 17. It should be noted that the force $F_v$ is usually approximately twice as large as each of the forces W and $W_r$.

The moments of force of the forces shown about their respective points of rotation, i.e. joint 17 and 18, respectively, may be calculated in a simple manner. By suitably selecting the locations of the first and second bar joints 31 and 33, and the lengths of the first and second bars 30 and 32, as a function of the position of the centre of gravity 36, it is possible to ensure that the moment of force which needs to be exerted by the actuator 35 about the first arm joint 17 can decrease by a factor of from two up to twenty, and also that the moment of force which needs to be exerted by the actuator 21 about the second joint 18 can decrease by a factor of from 2 up to 20.

FIG. 5 shows an embodiment with another position of the robot arm, with a simplified and diagrammatic representation (not to scale) of the associated forces in FIG. 6. In FIG. 5, the robot arm is swung in a long way, into the milking box. As a result, the centre of gravity 36 is in an entirely different position with respect to the joints 17 and 18. Without weight compensation device, the actuator 21 would now need to develop a large counterforce to compensate for the torque of the gravity about joint 18 (and 17). By means of the weight compensation device in the form of the spring device 25 with the bars 30 and 32, counterforces $F'_{v1}$ and $F'_{v2}$ are now exerted, which generate torques as compensation for the torques of the gravity W about the joints 17 and 18. During the swinging-in operation, the spring 25 is somewhat compressed to length L1, as a result of which the net spring force F'v changes. Via the bars 30 and 32, the components $F'_{v1}$ and $F'_{v2}$ then likewise change, with their torque-compensating effect. The force $F'_2$ which is still required now is much smaller than without the weight compensation device according to the invention, as a result of the largely compensated gravity torque. It should be noted here that it is advantageous if the spring has a high pretension, with the maximum differences in length over the operating range being small, for example a maximum of 30%. It also appears to be advantageous when the action of the force of the spring is in particular expressed in the direction of the (spring) force. For instance, FIG. 6 shows that F'2 acts in a different direction, because the centre of gravity is now elsewhere with respect to the associated joint (reference numeral 18 in FIG. 4). In order to absorb this well and still have a large reduction, the spring force now also acts in the opposite direction, in the form of component $F'_{v2}$. In order to achieve this, the bar system (reference numerals 30 and 32 in FIG. 4) needs to be dimensioned accordingly, so that it swings over in good time as far as the direction of action of the spring force is concerned.

It should be noted here that finding (the most) suitable positions and lengths for the arms 30 and 32 and a spring constant of the spring device 25 depends on the geometry of the robot arm 3 and the chosen operating range 40. It is quite straightforward to find a set of values which ensure a reduction in torque by half. Refining the invention to a set of values which ensure a reduction in torque by around 90 to 95% is more laborious but relatively straightforward, for example using a spring with adjustable spring constant and using two arms 30 and 32 which are slidable along the arm parts 3-1 and 3-2 and adjustable in length. In that case, reading the actuators 35 and 21, respectively, fairly quickly provides a good idea of suitable values. Incidentally, this trial-and-error method can be well supported by preliminary calculations.

The illustrated embodiments are not intended to be limiting, but are merely for explanation and illustration of the invention. The scope of protection of the invention is determined with reference to the attached claims.

The invention claimed is:

1. A milking robot device for automatically milking a dairy animal, comprising a milking box having a plurality of milking cups and a robot arm having an end effector for applying the milking cups to the teats of the dairy animal, on which milking box the robot arm is suspended above the dairy animal to be milked, wherein the robot arm comprises a first arm part connected to the milking box by a first joint, and a second arm part connected to the first min part by a second joint and provided with the end effector,
wherein the first arm part is pivotable in a vertical plane with respect to the milking box by a first actuator, and the second arm part is pivotable in a vertical plane with respect to said first arm part by a second actuator,
wherein the end effector is movable by the robot arm within an operating range,
wherein the milking robot further comprises a weight compensation device having a spring device, which is connected between the milking box and the robot arm, and which is configured to exert a first torque about the first joint and a second torque about the second joint, in such a way that, viewed over the operating range, the first torque compensates for the torque exerted by gravity on the arm about the first joint by at least half and the second torque compensates for the torque exerted by gravity on the arm about the second joint by at least half.

2. The milking robot device according to claim 1, wherein at least one of the actuators comprises an electrical actuator.

3. The milking robot device according to claim 1, wherein at least one of the actuators comprises a pneumatic actuator.

4. The milking device according to claim 1, wherein the spring device is connected at a first end to the milking box, and at a second end to the first arm part via a first bar, and to the second arm part via a second bar.

5. The milking device according to claim 4, wherein the first bar is connected to the first arm part on a half of the first arm part which faces away from the milking box, and wherein the second bar is connected to the second arm part on a half of the second arm part which faces the first arm part, in particular on a third of the second arm part which is connected to the first arm part.

6. The milking device according to claim 1, wherein the end effector comprises four cup holders each with a milking cup.

7. The milking robot according to claim 1, wherein the first torque compensates for the torque exerted by gravity on the arm about the first joint by at least 90%.

8. The milking robot according to claim 1, wherein the second torque compensates for the torque exerted by gravity on the arm about the second joint by at least 90%.

9. The milking robot device according to claim 1, wherein each of the actuators comprises an electrical actuator.

10. The milking robot device according to claim 1, wherein each of the actuators comprises a pneumatic actuator.

* * * * *